April 26, 1955 J. A. WOLLOW 2,707,049
EGG GRADER OR THE LIKE
Filed Dec. 23, 1952
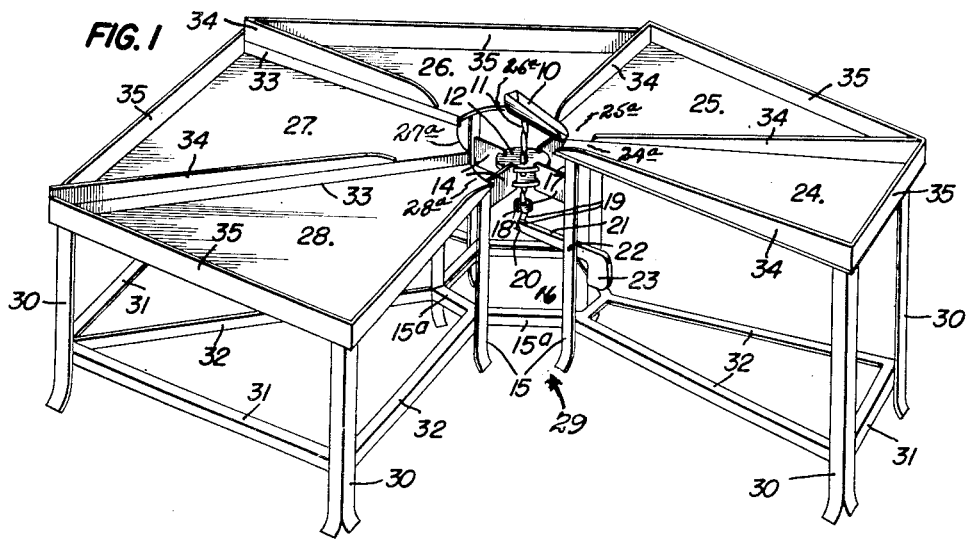
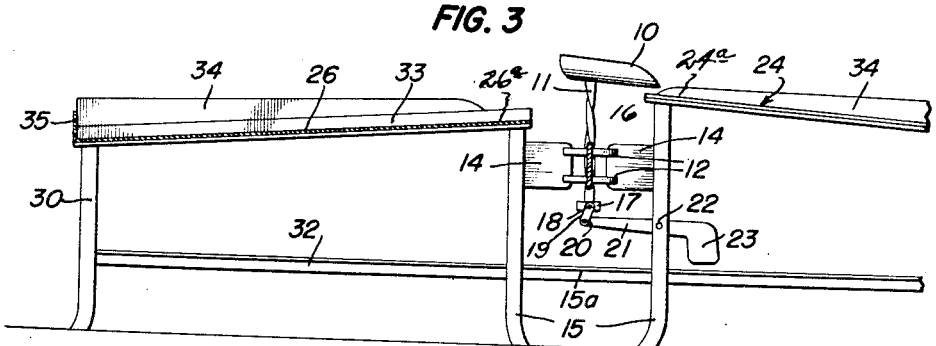
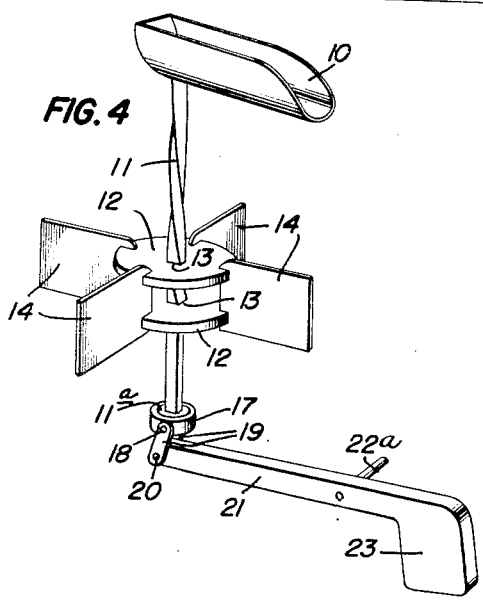
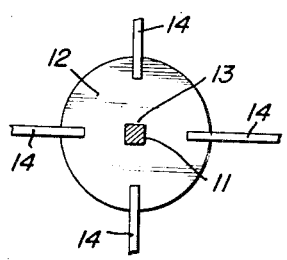
INVENTOR
Joseph A. Wollow
BY Eugene E. Stevens
ATTORNEY

United States Patent Office 2,707,049
Patented Apr. 26, 1955

2,707,049

EGG GRADER OR THE LIKE

Joseph A. Wollow, Danielson, Conn.

Application December 23, 1952, Serial No. 327,548

18 Claims. (Cl. 209—121)

My invention relates to improvements in automatic graders for eggs and other items to be segregated into weight groups.

Automatic graders for eggs and the like which have been proposed heretofore are unnecessarily expensive and are open to objection on various other grounds. For instance, they are quite complicated in construction and require the employment of electric motors, several weighing devices, and many intricate mechanisms. This means complicated set up or assembly procedures, and also such devices require constant re-calibration and servicing which means high operating expense.

It is therefore the primary object of my invention to overcome the objections noted and to produce a low cost and highly efficient device for the purpose specified which involves very few moving parts, requires no electric power for operation, and which can be readily installed and operated without calling upon any particular skill.

Additionally, it is an aim of the invention to provide an egg grader or the like which will rapidly and efficiently grade or segregate into different weight groups eggs or the like over long periods of time without any necessity for servicing or adjustment, and which will out perform the more expensive devices for this purpose heretofore known in the art.

Other objects and advantages of the invention will be readily apparent to those versed in the art upon reference to the accompanying drawings in connection with the detailed description thereof appearing hereinafter.

Although the drawings illustrate a now preferred example of my inventive concept, it is to be understood that same is susceptible of other mechanical expressions within the spirit and scope of the subject matter claimed hereinafter.

In the drawings, wherein the same reference characters have been used to designate the same parts throughout the several views—

Fig. 1 is a perspective view of an egg grader embodying my invention;

Fig. 2 is a central, fragmentary, top plan view thereof;

Fig. 3 is a fragmentary side elevation partly in section;

Fig. 4 is a perspective detail of the weighing unit and its support.

Referring to the drawings by reference characters, numeral 10 designates the scoop-form egg chute or receptacle which is downwardly inclined slightly toward its open outer end and receives successively, one at a time, the eggs or other articles to be graded. These may be placed in the chute 10 by hand or by means of an automatic feeder of known type.

The chute 10 is supported adjacent its closed rear end by the spirally twisted square rod 11. This rod 11 is secured to the bottom of chute 10 and works through the aligned square central holes 13 in a pair of fixedly spaced disks 12 which are illustrated in Figs. 1 and 4. As will be obvious, movement of the spirally twisted rod up and down is accompanied by a slow turning movement caused by the disk holes 13.

The rod-guiding disks 12 are carried by the vertical circumferentially spaced web form supports 14 whose outer ends are secured to certain of the upstanding posts 15 which are arranged in circumferential series as indicated in Figs. 1 and 2 about the spirally twisted rod 11 as a center. Lower braces 15a connect adjacent ones of the posts 15, as indicated.

Thus, the posts 15 define what might be termed a well 16 in the center of an egg tray-supporting frame to be presently described. Such frame, as shown in Fig. 1, provides a gap 29 adjacent the well 16 to be occupied by the operator when the apparatus is in use.

Referring back to the egg chute supporting rod 11, and turning to Fig. 4, it will be noted that the lower end of the twisted rod 11 terminates in a sphere segment bearing 11a which is rotatably and rockably confined within a bearing ring 17. The bearing ring 17 is supported by the upper ends of the vertical yoke-defining arms 19 which are pivoted to opposite sides of said bearing ring 17 as indicated at 18. The lower ends of the yoke-defining arms 19 are pivoted to opposite sides of the inner end of a weighing or scale arm 21 as indicated at 20.

The weighing or scale arm 21 is pivoted intermediate its ends as at 22 on a rod 22a which is supported by adjacent ones of the well defining legs 15, as indicated in Figs. 1 and 3. The outer end of the scale arm 21 is provided with the weight 23, as indicated in Figs. 1 and 4.

The several collecting trays which receive eggs of different weights from the weighing arm-controlled, spiral rod-supported chute or receptacle 10 are designated by reference characters 24, 25, 26, 27 and 28 in Fig. 1.

These egg-receiving trays 24–28 inclusive, are each segmental in form as viewed in plan with their narrowed inlet ends 24a, 25a, 26a, 27a, 28a, respectively, opening into the central well 16 below and inwardly of the plane of the circular path of travel of the outlet end of the egg discharging chute 10, as indicated in Figs. 1 and 3.

It will be apparent from an inspection of Figs. 1 and 4 that when an egg has been placed in chute 10, the latter with its spirally twisted supporting rod 11 will move downwardly while slowly turning counterclockwise until the additive weight of the rod 11, chute 10 and egg therein is counterbalanced by the weight 23 of scale arm 21. Thus entrances 24a, 25a, etc., are disposed at different levels and the egg tray 24 for receiving the smallest or lightest eggs to be graded will have its entrance 24a at the highest level. The next tray 25 for the next larger eggs will have its entrance 25a at a slightly lower level than that of the entrance 24a of the tray 24. The entrance end 26a of the tray 26 for large eggs will be at a slightly lower level from the entrance 25a of the tray 25 which receives the medium weight eggs. Then the tray 27 which receives large eggs will have its entrance 27a slightly lower than the entrance 26a adjoining, and finally the terminal tray 28 for jumbo sized or extra heavy eggs will have its entrance 28a at a lower level than the entrance 27a of the tray adjoining.

Between the trays 24 and 28 the tray-supporting frame leaves the earlier mentioned gap 29 to be occupied by the operator who either places the eggs in the chute 10 or observes the mechanical placing of same therein, and periodically collects eggs from the different trays.

In the illustrated form of the invention, the trays 24–28 inclusive, are supported at their outer ends upon the upper ends of posts 30 which are connected to one another by bars 31, there being also lower bars 32 connecting posts 30 to the central well defining posts 15.

At the side margins of the respective trays 24, 25 etc., there are provided bars of L-section which support the tray bottoms and connect the upper ends of the posts 30 with the upper ends of the well defining posts 15. Partitions 34 carried by the upper post connecting upper L-bars 33 separate the trays from one another. Also, as indicated in Figs. 1 and 3, the egg receiving trays 24, 25, etc., slant gently downwardly in the direction of the rear walls 35 which define the outer ends of the trays and make suitable connection with the partitions 34.

The operation of the apparatus may be summarized as follows:

The weight of the egg in chute 10 causes the latter along with the spiral rod 11, bearing 11a, 17, yoke arms 19 and scale arm 21 to move downwardly as an assembly until the weight thereof is overcome by the weight 23 at the outer end of the scale arm 21. During this downward movement, the rod-controlling and guide holes 13 of disks 12 acting upon the rod 11 cause the chute 10 to be swung counterclockwise from its starting position opposite the frame gap 29 (Fig. 1).

The amount of downward displacement of the chute 10 and related assembly will, of course, depend upon the weight of the egg; and the same is true as to the degree of counterclockwise rotation of the chute 10. Thus, the discharge end of the chute 10 will stabilize at the entry 24a, 25a, etc. of the particular weight group tray in which the egg in the chute belongs.

As the chute 10 swings its outlet end will pass above and closely adjacent the tray inlets 24a, 25a, etc., these inlets being progressively lower in the direction of rotation of the chute as previously mentioned. The spiral rod 11, the scale arm weight 23 and the spacing of the tray inlets 24a, 25a, 26a, etc. from one another are so calibrated that the exit end of the chute 10 will ultimately, as aforenoted, align itself with the proper tray for the corresponding weight of the egg in the chute 10.

The angle and length of the chute 10 is designed so that the time required for an egg to roll out of the chute will be slightly greater than the time required for the chute 10 to depress, stabilize, and align itself with the appropriate tray for any weight of egg.

Having thus described my invention, what I claim is:

1. A weighing type grader for eggs or other articles comprising in combination, a frame providing a central well, said frame having a gap therein communicating with said well for occupation by an attendant when the device is in use, segmental article-receiving trays supported upon said frame and arranged in continuous arcual series terminating at opposite sides of said gap, the bottom of each of said trays providing a narrowed article-entry projecting into said well, the narrowed article-entry bottom portions of successive trays from one side of said frame gap lying in a plane lower than the plane of the preceding one and each tray bottom sloping downwardly from its narrowed entry to its outer end, radially extending partitions separating the trays from one another and from said frame gap, the inner ends of said partitions terminating short of the inner entry portions of said trays, a swingably and depressably mounted chute-form receptacle for articles to be weighed and disposed above said well, said receptacle having an article discharge end inclined toward and movable over the narrowed article-entry bottom portions of said trays, frame-carried scale means having a receptacle load-depressed weighing member projecting into said well, a supporting connection between said receptacle and said weighing member and rotatably connected to the latter, cooperating means carried by said frame and receptacle-supporting connection and causing the latter and said receptacle to turn from an initial position opposite said frame gap toward the highest of said tray bottom entries upon depression of said weighing member under the action of said supporting connection and receptacle when an article to be weight-graded is placed in the latter.

2. The combination set forth in claim 1, and said receptacle-supporting connection comprising a spirally twisted rod.

3. The combination set forth in claim 1, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter.

4. The combination set forth in claim 1, and said weighing member comprising a scale beam pivotally supported by said frame intermediate its ends, and said scale means including a weight on the end of said beam remote from said receptacle-supporting connection.

5. The combination set forth in claim 1, and said receptacle-supporting connection comprising a spirally twisted rod, and said weighing member comprising a beam pivoted intermediate its ends to said frame, one end of said beam engaging said twisted receptacle-supporting rod, and a weight on the other end thereof.

6. The combination set forth in claim 1, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter, and said weighing member comprising a beam pivoted intermediate its ends to said frame, one end of said beam engaging said twisted receptacle-supporting rod, and a weight on the other end thereof.

7. In a weighing type grader for eggs and other articles, a frame, a swingable and depressably mounted frame-carried receptacle for articles to be weighed, a frame-carried scale means, a receptacle-depressed weighing member incorporated in said scale means, a supporting connection between said receptacle and said weighing member and rotatably connected to the latter, cooperating means carried by said frame and said receptacle-supporting connection and causing the latter and said receptacle to turn upon depression of said weighing member under the action of said supporting connection and receptacle when an article to be weight graded is placed in the latter, and said receptacle having article discharge means operable when said loaded receptacle has been counterbalanced by said weighing member.

8. The combination set forth in claim 7, and an arcual series of frame-carried weighed-article-collecting units with which said receptacle discharge means selectively communicates.

9. The combination set forth in claim 7, and said receptacle-supporting connection comprising a spirally twisted rod.

10. The combination set forth in claim 7, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter.

11. The combination set forth in claim 7, and said weighing member comprising a scale beam pivotally supported by said frame intermediate its ends, and said scale means including a weight on the end of said beam remote from said receptacle-supporting connection.

12. The combination set forth in claim 7, and said receptacle-supporting connection comprising a spirally twisted rod, and said weighing member comprising a beam pivoted intermediate its ends to said frame, one end of said beam engaging said twisted receptacle-supporting rod, and a weight on the other end thereof.

13. The combination set forth in claim 7, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter, and said weighing member comprising a beam pivoted intermediate its ends to said frame, one end of said beam engaging said twisted receptacle-supporting rod, and a weight on the other end thereof.

14. The combination set forth in claim 7, and an arcual series of frame-carried weighed-article-collecting units with which said receptacle discharge means selectively communicates, and said receptacle-supporting connection comprising a spirally twisted rod.

15. The combination set forth in claim 7, and an arcual series of frame-carried weighed-article-collecting units with which said receptacle discharge means selectively communicates, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter.

16. The combination set forth in claim 7, and an arcual series of frame-carried weighed-article-collecting units with which said receptacle discharge means selectively communicates, and said weighing member comprising a scale beam pivotally supported by said frame intermediate its ends, and said scale means including a weight on the end of said beam remote from said receptacle-supporting connection.

17. The combination set forth in claim 7, and an arcual series of frame-carried weighed-article-collecting units with which said receptacle discharge means selectively communicates, and said receptacle-supporting connection comprising a spirally twisted rod, and said weighing member comprising a beam pivoted intermediate its ends to said frame, one end of said beam engaging said twisted receptacle-supporting rod, and a weight on the other end thereof.

18. The combination set forth in claim 7, and an arcual series of frame-carried weighed-article-collecting units with which said receptacle discharge means selectively communicates, and said receptacle-supporting connection comprising a spirally twisted rod, and the frame-carried portion of said cooperating means comprising an element positioned in said well and having a guide hole shaped to conform to the cross section of said spirally twisted rod and slidably receiving the latter, and said weighing member comprising a beam pivoted intermediate its ends to said frame, one end of said beam engaging said twisted receptacle-supporting rod, and a weight on the other end thereof.

References Cited in the file of this patent

UNITED STATES PATENTS

| | | |
|---|---|---|
| 2,219,844 | Lotter et al. | Oct. 29, 1940 |
| 2,355,715 | Edington | Aug. 15, 1944 |
| 2,506,382 | Pagandak | Aug. 8, 1950 |